United States Patent
Burkert et al.

(10) Patent No.: US 7,251,767 B2
(45) Date of Patent: Jul. 31, 2007

(54) METHOD FOR CORRECTING ERRORS IN A PACKET-ORIENTED DATA TRANSMISSION

(75) Inventors: Frank Burkert, München (DE); Günther Liebl, Freising (DE); Thi Min Ha Nguyen, München (DE); Juergen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 541 days.

(21) Appl. No.: 10/343,444

(22) PCT Filed: Jul. 19, 2001

(86) PCT No.: PCT/DE01/02733

§ 371 (c)(1),
(2), (4) Date: Jul. 23, 2003

(87) PCT Pub. No.: WO02/11350

PCT Pub. Date: Feb. 7, 2002

(65) Prior Publication Data
US 2004/0039984 A1    Feb. 26, 2004

(30) Foreign Application Priority Data
Jul. 31, 2000 (DE) ............... 100 37 242

(51) Int. Cl.
G08C 25/02 (2006.01)
(52) U.S. Cl. ............. 714/748; 714/752; 714/755; 714/776
(58) Field of Classification Search ........ 714/748, 714/758, 752, 776, 763, 18, 2, 755
See application file for complete search history.

(56) References Cited

U.S. PATENT DOCUMENTS

| | | | | |
|---|---|---|---|---|
| 4,151,510 A | * | 4/1979 | Howell et al. ............... 714/758 |
| 4,438,494 A | * | 3/1984 | Budde et al. ................... 714/2 |
| 5,805,816 A | * | 9/1998 | Picazo et al. ................ 709/223 |
| 5,974,106 A | | 10/1999 | Dupont et al. |
| 6,049,892 A | * | 4/2000 | Casagrande et al. ........... 714/18 |
| 6,212,202 B1 | * | 4/2001 | Radimirsch et al. ........ 370/473 |
| 6,222,835 B1 | * | 4/2001 | Franz et al. ................. 370/349 |
| 6,357,029 B1 | * | 3/2002 | Sinha et al. ................ 714/752 |
| 6,522,635 B1 | * | 2/2003 | Bedwell ...................... 370/314 |
| 6,609,167 B1 | * | 8/2003 | Bastiani et al. ............. 710/104 |
| 6,681,364 B1 | * | 1/2004 | Calvignac et al. .......... 714/776 |
| 6,851,081 B2 | * | 2/2005 | Yamamoto ................... 714/763 |

FOREIGN PATENT DOCUMENTS

| | | |
|---|---|---|
| CA | 2343166 | 3/2000 |
| DE | 69024928 T2 | 6/1996 |
| DE | 69305734 T2 | 5/1997 |
| DE | 69219141 T2 | 7/1997 |
| DE | 69416849 T2 | 7/1999 |
| DE | 19845193 | 5/2000 |
| EP | 0433154 B1 | 6/1991 |
| EP | 0632625 B1 | 10/1996 |
| EP | 0604523 B1 | 4/1997 |
| EP | 0726002 B1 | 3/1999 |

* cited by examiner

OTHER PUBLICATIONS

Rosenberg et al., "An RTP Payload Format for Generic Forward Error Correction", Network Working Group, Dec. 1999, pp. 1-23.

*Primary Examiner*—Guy Lamarre
*Assistant Examiner*—Fritz Alphonse
(74) *Attorney, Agent, or Firm*—Staas & Halsey LLP

(57) ABSTRACT

Descriptors are used, which combine the code words of a transmission block of the same correctability into a subset, and which describe the size of the subset as well as the difference in the correctability of the previously concerned subset.

17 Claims, 1 Drawing Sheet

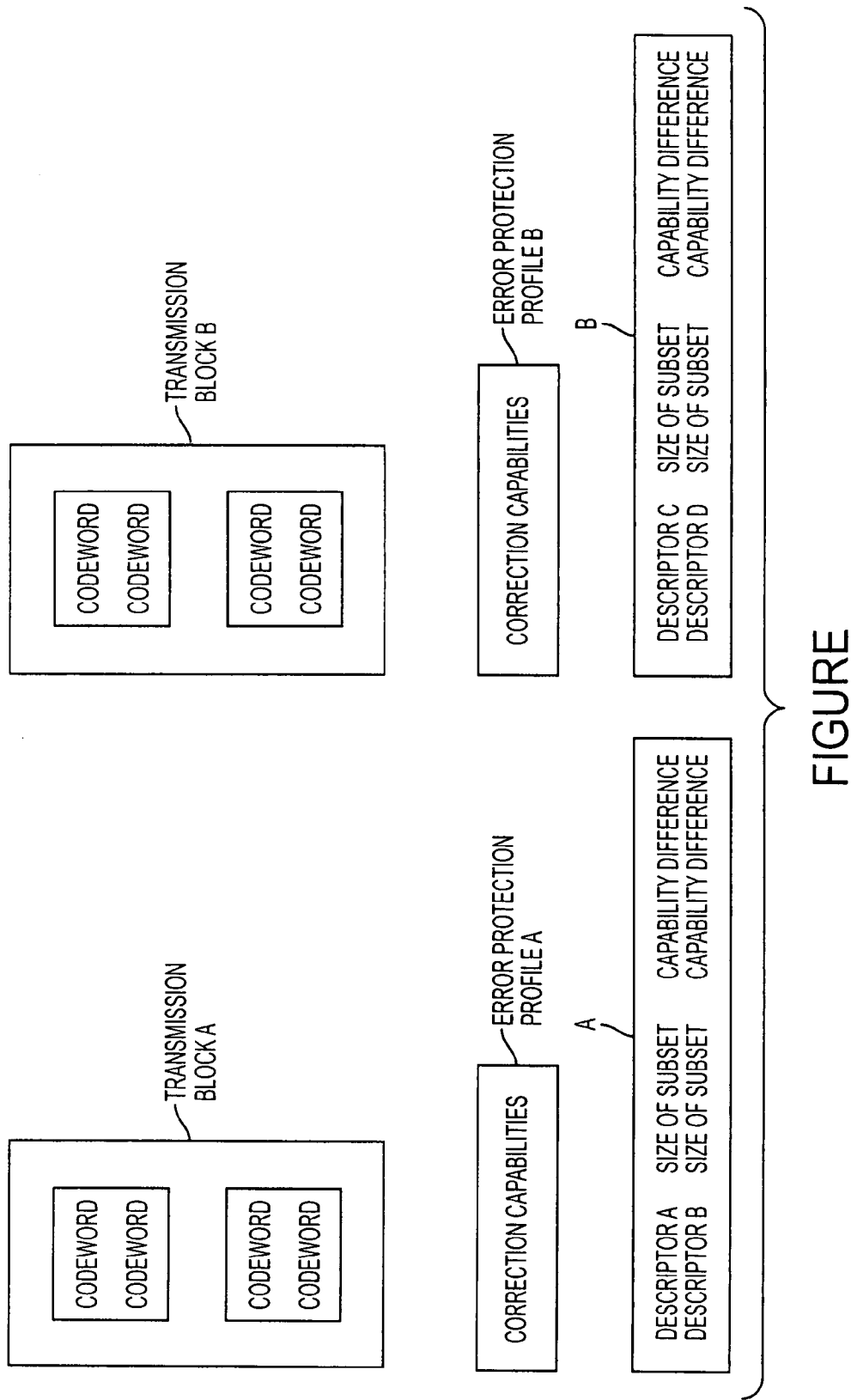

METHOD FOR CORRECTING ERRORS IN A PACKET-ORIENTED DATA TRANSMISSION

CROSS REFERENCE TO RELATED APPLICATIONS

This application is based on and hereby claims priority to PCT application No. PCT/DE01/02733 filed on 19 Jul. 2001 and German Application 100 37 242.2 filed on 31 Jul. 2000, the contents of which are hereby incorporated by reference.

BACKGROUND OF THE INVENTION

The invention relates to a method for error correction, in which mechanisms for repetition of data packets with errors are not possible owing to the excessive transmission delays associated with them.

During packet-oriented transmission of data, bit errors generally occur in landline networks owing to overloading at network nodes and, in the case of mobile channels, as a result of atmospheric interference and multipath propagation, and these bit errors are detected by error-recognition codes and lead to rejection of entire packets. So-called reliable transport protocols such as TCP use repetition mechanisms (Automatic Repeat Request Methods) in order to make it possible to transport packets which have been lost or rejected reliably to the receiver despite channels being subject to interference. However, this is associated with a very considerable increase in the transmission delay, which may however be intolerable, especially for communications purposes. Unreliable transport protocols, for example UDP, are therefore used in this case. Although these do not result in any increase in the transmission delay, they do not, however, offer any mechanisms for compensating for packet losses, either. For some time, the audiovisual transport group (AVT) of the IETF have been making intensive efforts to link methods for forward error correction (FEC) and packet-oriented transmission to unreliable transport protocols. In this case, by way of example, a plurality of data packets are coded in one step and the z code words $cw_i$ which result from this, where $0 \leq i < z$, of length N are arranged in a memory array such that the code words form the rows or columns of a z×N or N×z matrix. Columns and/or rows are then mapped onto packets of a transport layer, for example RTP/UDP, and are transmitted. In order to make it possible to achieve source-adaptive coding, the code words $cw_i$ in a matrix may have different protection against errors and deletions.

If the expression $ep_i$ is used in the following text to denote the correction capability of a code word $cw_i$, then a so-called error protection profile EPP describes the correction capability of the set of code words which are combined in a matrix EPP={$ep_0$, $ep_1$, . . . $ep_{z-1}$}. The error protection profile for two successive matrices or transmission blocks may be different, depending on whether it relates to the matching of error protection to the source or else to the channel. However, in order to make it possible to decode the code words in a transmission block at the receiver, the corresponding error protection profile must be known to the decoder or must be transmitted to the decoder. This is dependent on reliable signaling, which should be efficient in order to keep the additional overhead as low as possible. It would be very inefficient to transmit a sufficiently large number of fields for this purpose in the header of each transmission packet, and transmission outside the logical channel (out-of-band signaling) involves additional complexity.

SUMMARY OF THE INVENTION

A potential object on which the invention could be based is now to specify a method for error correction for packet-oriented transmission which is as reliable and efficient as possible in terms of the signaling that is required for this purpose.

One aspect of the invention relates to the use of descriptors which combine code words in a transmission block with the same correction capability in a subset, and which describe the size of the subset as well as the difference in the correction capability from the previous subset (differential description).

BRIEF DESCRIPTION OF THE DRAWINGS

The FIGURE schematically shows the arrangement of error correction parameters according to one embodiments of the invention.

DETAILED DESCRIPTION OF THE PREFERRED EMBODIMENT

Reference will now be made in detail to the preferred embodiments of the present invention, examples of which are illustrated in the accompanying drawing.

All the exemplary embodiments have the common feature that at least one descriptor DP=(n, ep) is produced, where DP denotes a subset of n immediately successive code words with the same error protection in the transmission block. The argument ep produces a relationship between the error protection of the code words in this subset and the error protection of the code words in the immediately preceding subset of code words. If both the size and error protection of the first subset are known, for example by out-of-band signaling when setting up the connection, the descriptors can be used at the receiver end to determine the error protection profile EPP of the transmission block. However, to do this, it must also be possible to reliably construct the descriptors in the receiver even in the event of packets being lost and errors during transmission. The descriptors are therefore advantageously mapped onto the first code words in the transmission block, in which case at least the error protection for the first code word must be determined in advance for this purpose. For decoding, a transition from descriptors to data can either be signaled by a specific start code or, if the size of the transmission block is known, it can also be calculated since the total number z of code words is in fact known. This specific start code may, for example, be a reserved descriptor. A receiving-end decoder decodes the first code word $cw_0$ in a transmission block and sets $ep_0$ to $ep_{max}$, with the maximum correction capability $ep_{max}$ being known since, for example, it has been transmitted while setting up the connection. The decoder is thus provided with knowledge about the first descriptors and can decode the second code word, since the correction capability ep, can be determined from the first decoded descriptor and $ep_{max}$. There are a large number of implementation options for the structure, that is to say the mapping of n and ep on the descriptor DP. Some of these will be described in the following text with reference to six examples, with the codes that are used for error protection being defined using the Galois field GF ($2^8$) or being byte-oriented, with the length of the z code words being assumed to be N and the code words forming the rows in a matrix or in a transmission block, and with the transmission packets being formed from the columns of the transmission block.

EXAMPLE 1

The error protection profile EPP of the transmission block is as follows:
EPP={14,7,7,7,7,4,4,4,4,4,4,4,4,4,4,3,3,3,3,6,6,6,6,6,6,0,0,0,0,0,0,0}, that is to say z=32.

The descriptors each comprise one byte. The information N and ep is in each case coded using 4 bits, where N is of the unsigned type, and ep of the signed type. As can be seen from the error protection profile EPP, the first subset of code words comprises four code words which have a correction capability of 7, which is thus 7 less than $ep_0=ep_{max}=14$. The first descriptor is therefore DP=0x4F, since in this case N represents the left half byte and the difference between the correction capabilities ep represents the right half byte, with the second half byte F meaning signed hexadecimal −7, that is to say ep=14−7=7. The next subset comprises ten code words with the correction capability 4, so that the second descriptor is DP=0xAB, since A means unsigned hexadecimal N=10 and B means signed hexadecimal −3, that is to say ep=7−3=4. The third descriptor is DP=0x49 and the last two descriptors are DP 0x63 and DP=0x7E. Since z is known, the decoder knows the location of the transition from descriptors to data in the decoded code word. If it is assumed that z is unknown, the transition can be signaled by the start code SC=0x00, since SC is not a valid descriptor.

EXAMPLE 2

If, in the structure of the descriptors given in Example 1, the difference between the correction capability of two subsets is greater than 7, then it is advantageous to use two descriptors to signal the transition. If the error protection profile is assumed to be EPP={17,5,5}, then the first descriptor is DP=0x0F. Since the first half byte is 0, the decoder knows that the change in the correction capability is greater than 7. The size of the next subset is signaled in the next descriptor, in which DP=0x2D. The change in the correction capability is thus signaled as −12 (ep=17−7−5=5). A similar method can be used if the size of the subset is greater than 15.

EXAMPLE 3

This example is intended to consider the situation in which both the change in the correction capability and the size of the subset exceed the maximum value which can be represented in one half byte, for example in the case of the error protection profile EPP={14,4,4,4,4,4,4,4,4,4,4,4,4,4,4,4,4,4,4,4,4}. As in Example 2, the first descriptor is 0x0F. The second descriptor DP is 0xFB, indicating that the subset comprises 15 code words and that the correction capability is 10 less than in the previous subset. However, since this subset comprises 20 code words, as is evident from the error protection profile EPP, the next descriptor is 0x50, which means five further code words with a different correction capability. If these situations from Example 2 and Example 3 occur frequently, it is, however, advantageous to represent the respective descriptor itself by two or more bytes.

EXAMPLE 4

If the code words are arranged such that $ep_i<ep_j$, i<j, then the second half byte may also be of the unsigned type. With an error protection profile of EPP={14,10,10,0,0,0}, this would then result in the two descriptors being DP=0x24 DP=0x3A.

EXAMPLE 5

If the error protection profile EPP is in a form such as EPP={14,13,13,12,12,11,11, . . . 2,2,1,1,0,0,0,0,0,0}, then a descriptor in the form DP=0x21 is sufficient, indicating that one subset always comprises 2 code words and the correction capability always decreases by 1 between two successive subsets.

EXAMPLE 6

If an error protection profile is in the form EPP={14,13,13,13,13,13,13,13,13,7,7,7,6,6,6,5,5,5,4,4,4,3,3,3,2,2,2,1,1,1,0,0,0,0,0,0,0} or something similar, then efficient signaling can appear in such a way that a descriptor such as that in Example 1, in this case for example DP=0xDE, followed by a descriptor from Example 4, in this case for example DP=0x31, is initially used for signaling.

In general, any desired combinations of descriptors are feasible. The change in the structure of the descriptors can be carried out at predetermined limits or can be signaled by specific codes, for example 0x00.

The invention has been described in detail with particular reference to preferred embodiments thereof and examples, but it will be understood that variations and modifications can be effected within the spirit and scope of the invention.

The invention claimed is:

1. A method for error correction for packet-oriented data transmission, comprising:
   transmitting sets of code words of data in respective transmission blocks;
   producing, for each transmission block, an error protection profile containing information regarding correction capabilities of the set of code words of the transmission block;
   forming, for each transmission block, descriptors for subsets of immediately successive code words with the same correction capability, each descriptor describing the size of the subset and the difference in the correction capability of the subset relative to the preceding subset in the transmission block; and
   transmitting the descriptors and data in the same band.

2. The method as claimed in claim 1, wherein
   a defined data segment is allocated to each descriptor, and
   if the difference in the correction capability does not fit in a single data segment, then the difference in the correction capability is mapped onto a plurality of data segments.

3. The method as claimed in claim 2, wherein
   when a plurality of successive subsets have the same size and in each case have the same difference in the correction capability with the respectively preceding subset, then only one descriptor is used for the plurality of successive subsets.

4. The method as claimed in claim 3, wherein
   the transmission blocks containing the descriptors and the data are transmitted in the same band to a receiver,
   the descriptors are dispersed in the transmission blocks as a function of the error protection profile, and
   transitions between descriptors and data are defined by specific codes.

5. The method as claimed in claim 4, wherein
each descriptor is contained in a byte,
for each descriptor, a first half of the byte describes the number of code words in the respective subset, and
for each descriptor, a second half of the byte describes the difference in the correction capability relative to the respectively preceding subset.

6. The method as claimed in claim 5, wherein for each transmission block the descriptors are mapped onto the first code words of the transmission block.

7. The method as claimed in claim 6, wherein
the transmission blocks containing the descriptors and the data are transmitted in the same band to a receiver, and
within each block, the receiver recognizes a transition from descriptors to data based on known sizes for the transmission blocks and the descriptors.

8. The method as claimed in claim 7, wherein
the transmission blocks containing the descriptors and the data are transmitted in the same band to a receiver, and
for each transmission block, a transition from descriptors to data is signaled to the receiver by a specific start code.

9. The method as claimed in claim 8, wherein the specific start code is in the form of a descriptor reserved for this purpose.

10. The method as claimed in claim 1, wherein
when a plurality of successive subsets have the same size and in each case have the same difference in the correction capability with the respectively preceding subset, then only one descriptor is used for the plurality of successive subsets.

11. The method as claimed in claim 1, wherein
the transmission blocks containing the descriptors and the data are transmitted in the same band to a receiver,
the descriptors are dispersed in the transmission blocks as a function of the error protection profile, and
transitions between descriptors and data are defined by specific codes.

12. The method as claimed in claim 1, wherein
each descriptor is contained in a byte,
for each descriptor, a first half of the byte describes the number of code words in the respective subset, and
for each descriptor, a second half of the byte describes the difference in the correction capability relative to the respectively preceding subset.

13. The method as claimed in claim 1, wherein for each transmission block the descriptors are mapped onto the first code words of the transmission block.

14. The method as claimed in claim 1, wherein
the transmission blocks containing the descriptors and the data are transmitted in the same band to a receiver, and
within each block, the receiver recognizes a transition from descriptors to data based on known sizes for the transmission blocks and the descriptors.

15. The method as claimed in claim 1, wherein
the transmission blocks containing the descriptors and the data are transmitted in the same band to a receiver, and
for each transmission block, a transition from descriptors to data is signaled to the receiver by a specific start code.

16. The method as claimed in claim 15, wherein the specific start code is in the form of a descriptor reserved for this purpose.

17. A method for error correction for packet-oriented data transmission, comprising:
transmitting sets of code words of data in respective transmission blocks;
forming, for each transmission block, descriptors for subsets of immediately successive code words with the same correction capability, each descriptor describing the size of the subset and the difference in the correction capability of the subset relative to the preceding subset in the transmission block; and
transmitting the descriptors and data in the same band.

* * * * *